United States Patent [19]

Horst et al.

[11] Patent Number: 5,986,418
[45] Date of Patent: Nov. 16, 1999

[54] NOISE REDUCTION IN A SWITCHED RELUCTANCE MOTOR BY CURRENT PROFILE MANIPULATION

[75] Inventors: Gary E. Horst, Manchester; J. Joseph Muller, St. Louis, both of Mo.

[73] Assignee: Emerson Electric Co., St. Louis, Mo.

[21] Appl. No.: 08/976,936

[22] Filed: Nov. 24, 1997

Related U.S. Application Data

[63] Continuation of application No. 08/520,167, Aug. 25, 1995, abandoned, which is a continuation-in-part of application No. 08/187,532, Jan. 28, 1994, Pat. No. 5,461,295.

[51] Int. Cl.$^6$ .................................................. H02K 23/00
[52] U.S. Cl. .......................................... 318/254; 318/701
[58] Field of Search ..................................... 318/254, 701

[56] References Cited

U.S. PATENT DOCUMENTS

| | | | |
|---|---|---|---|
| 4,249,116 | 2/1981 | Hieda | 318/254 |
| 4,253,053 | 2/1981 | Ray et al. | 318/701 |

(List continued on next page.)

FOREIGN PATENT DOCUMENTS

| | | | |
|---|---|---|---|
| 4 036 565 A1 | 5/1992 | Germany | H02P 8/00 |
| 2 167 253 | 5/1986 | United Kingdom | H02P 6/00 |
| 2 167 910 | 6/1986 | United Kingdom | H02K 1/06 |
| WO 93/05564 | 3/1993 | WIPO | H02P 6/02 |
| 9428618 | 12/1994 | WIPO . | |

OTHER PUBLICATIONS

Frede Blaabjerg and John K. Pedersen, "Digital Implemented Random Modulation Strategies for AC and Switched Reluctance Drives," *Proceedings of the IECON'93*, pp. 676–682, International Conference Industrial Conference on Industrial Electronics, Control and Instrumentation, Maui, Hawaii, Nov. 15–19, 1993.

Richard S. Wallace and David G. Taylor, "A Balanced Commutator for Switched Reluctance Motors to Reduce Torque Ripple," *IEEE Transactions on Power Electronics*, vol. 7, No. 4, pp. 617–626, Oct. 1992.

(List continued on next page.)

*Primary Examiner*—David Martin
*Attorney, Agent, or Firm*—Arnold, White & Durkee

[57] ABSTRACT

A method for controlling the current profile for current supplied to each phase of a poly-phase switched reluctance motor when a respective phase of the motor is active. The interval each motor phase is active is determined as a function of motor operating conditions, as is a desired profile of current flow into and out of a phase winding (W) associated with the phase. The current profile has an initial portion (Z1) in which current flows into the winding from an initial value current value to a peak current value ($I_p$). It also has a terminal portion (Z3) including current cut-off to the winding with current in the winding being either stored or dissipated prior to the phase becoming inactive. There may also be an intermediate portion (Z2) occurring between attainment of the peak current and the beginning of the terminal portion of the current profile. Current flow to the winding starts at the beginning of the initial portion of the phase, and current flow to the phase winding is cut-off prior to the end of the phase. Termination of current flow to the phase winding normally causes ringing in the motor because of the abrupt transition in current flow which occurs at current cut-off. However, according to the invention, current flow to the phase winding is now controlled throughout the active portion of the phase in accordance with the predetermined current profile. This includes determining the slope of current ramp-up during the initial portion of the profile until the peak current level is achieved; and, curvature of the current profile subsequent to cut-off of current flow to the phase winding. The current profile is controlled such that the slope of curvature of the profile immediately prior to current cut-off corresponds to the slope thereof immediately after cut-off. As a result, there is no transition in the current profile at current cut-off, and no ringing is produced in the motor by terminating current flow to the phase winding.

22 Claims, 6 Drawing Sheets

U.S. PATENT DOCUMENTS

| | | | |
|---|---|---|---|
| 4,427,910 | 1/1984 | Richter et al. | 310/214 |
| 4,447,771 | 5/1984 | Whited | 318/661 |
| 4,488,101 | 12/1984 | Studtmann | 318/800 |
| 4,661,756 | 4/1987 | Murphy et al. | 318/701 |
| 4,670,696 | 6/1987 | Byrne et al. | 318/701 |
| 4,712,050 | 12/1987 | Nagasawa et al. | 318/254 |
| 4,761,580 | 8/1988 | Hein et al. | 310/214 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |
| 4,943,760 | 7/1990 | Byrne et al. | 318/701 |
| 4,961,038 | 10/1990 | MacMinn | 318/696 |
| 5,072,166 | 12/1991 | Ehsani | 318/696 |
| 5,075,610 | 12/1991 | Harris | 318/701 |
| 5,119,000 | 6/1992 | Schultz et al. | 318/254 |
| 5,124,607 | 6/1992 | Rieber et al. | 310/214 |
| 5,144,209 | 9/1992 | Ingi et al. | 318/254 |
| 5,196,775 | 3/1993 | Harris et al. | 318/638 |
| 5,239,217 | 8/1993 | Horst | 310/51 |
| 5,343,105 | 8/1994 | Sakabe et al | 310/179 |
| 5,446,359 | 8/1995 | Horst | 318/701 |
| 5,461,295 | 10/1995 | Horst | 318/701 |

OTHER PUBLICATIONS

Richard S. Wallace and David G. Taylor, "Low–Torque–Ripple Switched Reluctance Motors for Direct–Drive Robotics," *IEEE Transactions on Robotics and Automation*, vol. 7, No. 6, pp. 733–742, Dec. 1991.

Richard S. Wallace, Jr., "Design and Control of Switched Reluctance Motors to Reduce Torque Ripple," Georgia Institute of Technology, Nov. 1990.

F. Blaabjerg et al., "Investigation and Reduction of Acoustical Noise from Switched Reluctance Drives in Current and Voltage Control," Sep. 5–71994, Proc. ICEM '94, pp. 589–594.

C.Y. Wu and C. Pollock, "Analysis and Reduction of Vibration and Acoustic Noise in the Switched Reluctance Drive," 1993, Proceedings of the IAS '93, pp. 106–113.

S. Chan et al., "Performance Enchancement of Single–Phase Switched–Reluctance Motor by DC Link Voltage Boosting," Sep. 1993, IEEE Proceedings–B, vol, 140, pp. 316–322.

Stephenson and Blake, "The Characteristics, Design and Applications of Switched Reluctance Motors and Drives," PICM Conference & Exhibition, Jun. 21–24, 1993, Nuremberg, Germany.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Shi–Ping Hsu et al., "Modeling and Analysis of Switching DC–to–DC Converters in Constant–Frequency Current–ProgrammedMode," 1979, IEEE Power Electronics Specialists Conference, pp. 284–301.

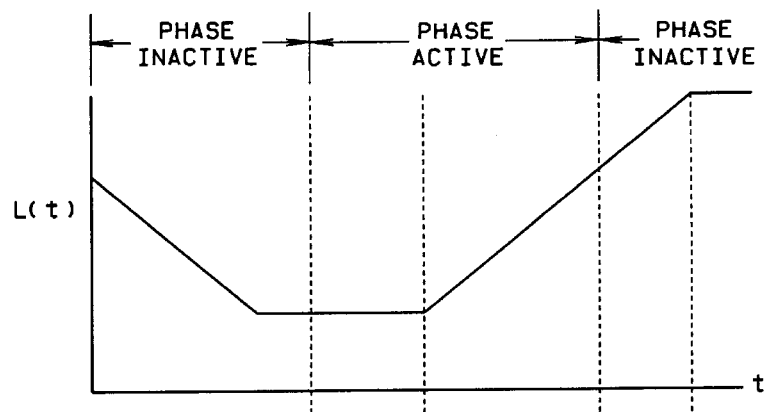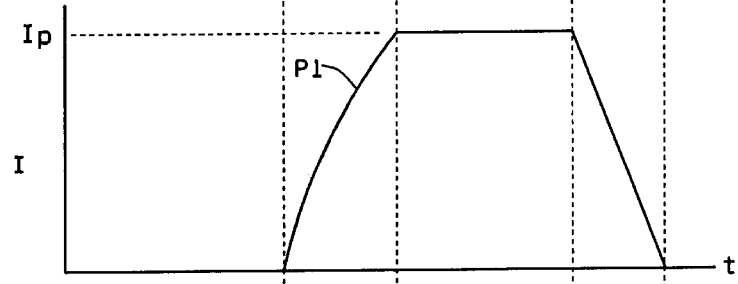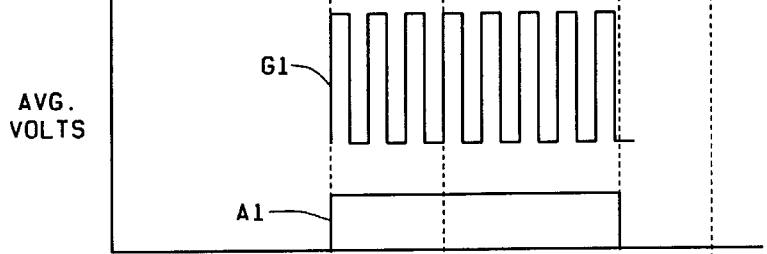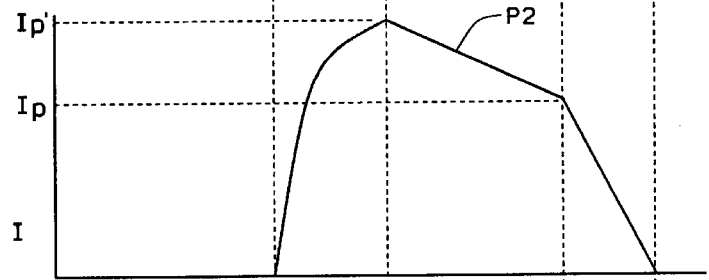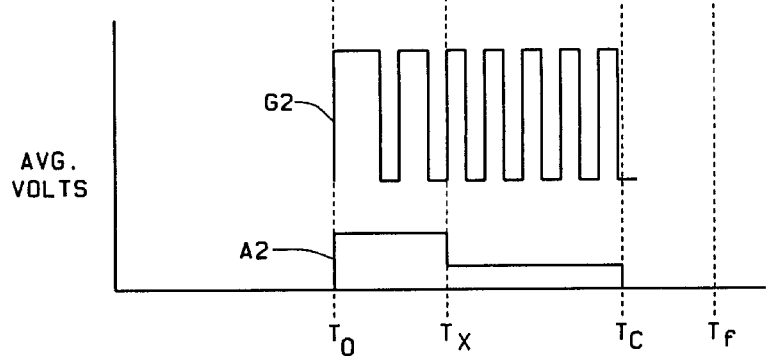

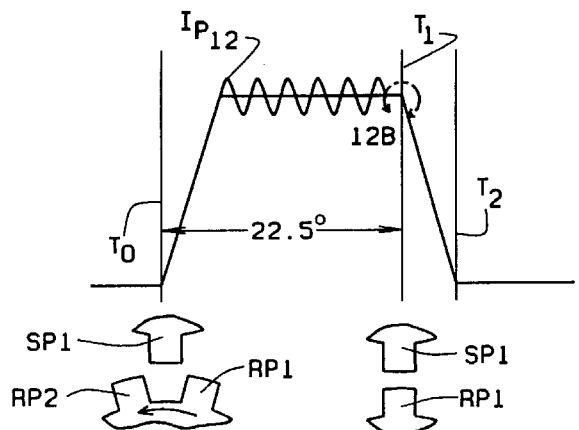
FIG. 9A PRIOR ART
FIG. 9B PRIOR ART
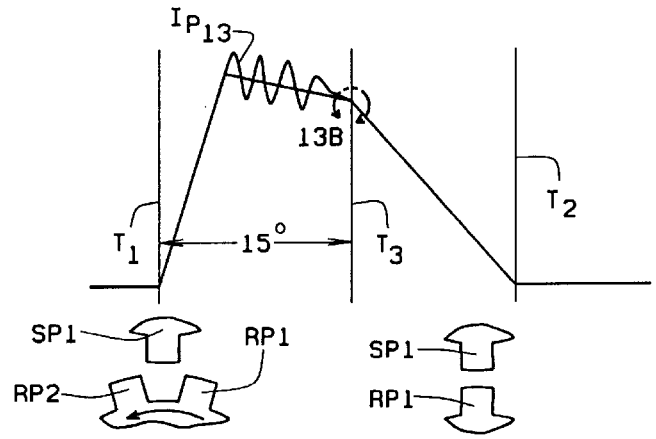
FIG. 10A
FIG. 10B
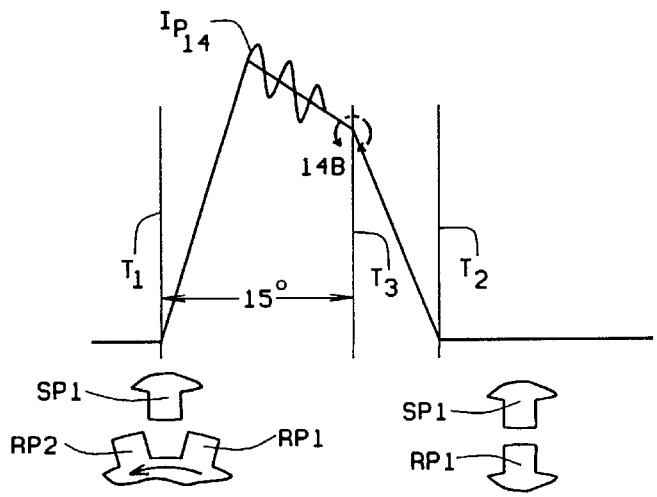
FIG. 11A
FIG. 11B

NOISE REDUCTION IN A SWITCHED RELUCTANCE MOTOR BY CURRENT PROFILE MANIPULATION

This application is a continuation of application Ser. No. 08/520,167 filed Aug. 25, 1995, which is a continuation in part of application Ser. No. 08/187,532 filed Jan. 28, 1994, now U.S. Pat. No. 5,461,295.

BACKGROUND OF THE INVENTION

This invention relates to switched reluctance (SRM) motors and, more particularly, to a method of reducing motor noise by controlling or manipulating a current profile for a motor.

Switched reluctance, or SRM motors are well-known in the art. One problem with operating these motors is noise. As discussed in my related U.S. Pat. No. 5,446,359, one source of this noise is caused by the dissipation of current in a motor's phase windings as each phase is switched at the end of its cycle. As the motor is switched from one phase to another, the energy, which represents approximately thirty percent (30%) of the energy supplied to the phase winding during its active period, decays off. As described in the application, a portion of this energy is either recovered using a storage capacitor, or dissipated.

In general, it will be understood that a major cause of motor noise is an abrupt change in the normal forces to which the motor is subjected. The noise is particularly acute if any of these transitions occur when at the maximum deflection points in the a motor cycle. In coassigned U.S. Pat. No. 4,239,217, there is described a phenomenon referred to as "ovalizing". This is a condition in which the general circular shaped rotor and stator of a motor tend to be distorted into an oval shape by the forces produced when rotor poles and stator poles come into alignment. These earlier applications further describe techniques by which these ovalizing forces can be minimized.

It will be understood that while the approaches set forth in the earlier applications are effective in reducing motor noise, other efforts to further reduce motor noise are also important. One of these is to control the current profile of each motor phase. One control scheme by which current is controlled to minimize torque, uses various look-up tables or schedules to effect control. (See U.S. Pat. No. 4,868,477 to Anderson et al.) It is also known to control a current profile by advancing the length of a phase thereby increasing motor dwell time for the phase. (See U.S. Pat. No. 4,253,053 to Ray et al.) A third scheme is discussed by S. Chan and H. R. Bolton in their paper Performance Enhancement of Single-phase Switched Reluctance Motor by DC Link Voltage Boosting; IEEE Proceedings-B, Volume 140, Paper No. 5, September, 1993. Here, current is put into a phase and subsequently taken out at a faster than normal rate by employing a boost voltage at the beginning and end of a phase. A drawback with this approach is its inflexibility.

While the above approaches may be effective, they require a significant amount of circuitry, or a significant amount of manipulation, to achieve a reasonable amount of control. Other ways of current profile control may be more effective and easier to achieve. It is important to understand that noise reduction is accomplished by matching as closely as possible the slope of the current profile at the end of the active portion of a phase with the slope of the tail current decay portion of the profile. There is disclosed apparatus and a method for controlling tail current decay in related U.S. Pat. No. 5,446,359. In accordance with the disclosure therein, the slope of the decay portion of the profile is controllable. By using the circuitry and method as disclosed herein, the phase active portion of the profile is controllable so a smoother transition is now obtainable, without effecting the period of the phase or other significant motor operating parameters to effect significant noise reduction.

During any phase of motor operation, there are essentially three intervals. First, is a ramp-up from a zero current level to a peak or near-peak current level. Second, is an interval in which the current is rounded or profiled. Third, is the current decay or tail current interval. Tail current can be defined as a downward trend in current (from a positive current level toward zero current) when the current level would otherwise be expected to be generally flat. Throughout the entire phase interval (zero level to peak, and back to zero) the current supplied to a motor phase winding is pulse width modulated. From approximately the peak current level to current cut-off, and from cut-off to zero current, the profiling is achieved by using hard chopping or soft chopping, or both, of the input current waveform. As noted above, under present current control schemes, there is a transition point which occurs at cut-off. This cut-off point defines the beginning of the current recovery period since current can be extracted from the phase winding by dissipation in the winding, or by recovering a portion of the current into an energy storage device such as a capacitor. In prior attempts to control tail current, there has been an effort to modify the abrupt transition which occurs at cut-off. This is done in an effort to reduce the normal formals produced in the motor at this time and, in turn, reduce the undesirable motor noise. However, the transitional change is still so significantly pronounced that there is still excessive ringing which, if eliminated, will enhance motor performance.

In related U.S. Pat. No. 5,446,359, tail current control was achieved by controlling the rate of decay using pulse width modulation (PWM). This involved zero volt chopping, using PW or control signals, to produce a desired slope in the current decay portion of the profile. In co-pending application Ser. No. 08/187,532 of which this is a continuation-in-part, the slope of the current profile was controlled in a portion of the active region of the waveform. This was done using hard or soft chopping techniques and was done to lessen the transition which occurs in the slope at the transition between the active and inactive (or tail current decay) portions of the waveform. Again, one objective of this is to reduce the ringing or noise which results from an abrupt transition to produce a smoother running motor and one subjected to reduced internal motor forces.

SUMMARY OF THE INVENTION

Among the several objects of the present invention may be noted the provision of a control scheme and method for manipulating the current profile in each phase of a single or poly-phase SRM, for example, 2-phase and 3-phase SRM's such as a 12-6, 2-phase SRM and a 6-4, 3-phase SRM;

the provision of such a control scheme and method which controls the current profile during the active portion of each phase so as to lessen motor noise;

the provision of such a control scheme and method which uses either hard chopping and soft chopping current control techniques to control the current profile;

the provision of such a control scheme and phase which drives the current level to a peak amplitude exceeding that to which the current is normally driven;

the provision of such a control scheme and method which further allows the current to fall from its peak to a lower level, this occurring during the normal phase active portion of a phase thereby for the change in slope of the current profile which occurs when the phase becomes inactive to be much less abrupt than when it would otherwise be;

the provision of such a control scheme and method which are readily incorporated into existing SRM control circuitry and which can include a microprocessor;

the provision of such a control scheme and method which drives the current to the peak by initially significantly increasing voltage input to the phase winding;

the provision of such a control scheme and method which controls the duty cycle of a PWM signal used to control current flow in a phase winding when the phase is active thereby to rapidly drive the current to its peak amplitude at the beginning of the phase's active period;

the provision of such a control scheme and method which alternately controls the frequency of the PWM signals to achieve the same result;

the provision of such a control scheme and method to vary both duty cycle and PWM frequency to accomplish the same result;

the provision of such a control scheme and method to modify the normal forces within the motor so there is a less abrupt change in the normalized ovalizing forces acting on the motor when the motor phase changes from active to inactive thereby to reduce ringing in the motor;

the provision of a method for substantially eliminating the transition which occurs at current cut-off during a motor phase;

the provision of such a method in which a slope is determined for the current waveform during the tail current position of the waveform, both during the active portion of a phase interval and the period from current cut-off to the point when the current decays to zero, the phase interval being a function of motor load and other motor operating parameters;

the provision of such a method to extrapolate the slope back from the predetermined current cut-off and current decay portion of a phase interval to a time at which a peak current in the current waveform should occur;

the provision of such a method to further determine the ramp-up slope of the initial portion of a current waveform so the current reaches a predetermined peak current at a predetermined time within the phase interval;

the provision of such a method to profile the current waveform about the current peak so the slope of the tail current from the peak corresponds to the slope of the current waveform from current cut-off until the termination of the phase;

the provision of such a method by which conforming the waveform slopes before and after cut-off substantially eliminates any abrupt transition in the waveform slope which would otherwise be present elimination ringing or any motor noise which would otherwise occur at the transition; and, the provision of such a control circuit which is a low cost, reliable circuit which functions to reduce noise throughout the range of SRM operation.

In accordance with the invention, generally stated, a method is disclosed for controlling the current profile for current supplied to each phase of a poly-phase switched reluctance motor when a respective phase of the motor is active. The interval each motor phase is active is determined as a function of motor operating conditions, as is a desired profile of current flow into and out of a phase winding associated with that phase. The current profile has an initial portion in which current flows into the winding from an initial value current value to a peak current value. It also has a terminal portion including current cut-off to the winding with current in the winding being either stored or dissipated prior to the phase becoming inactive. There is also an intermediate portion between attainment of the peak current and the beginning of the terminal portion of the current profile. Current flow to the winding starts at the beginning of the initial portion of the phase, and current flow to the phase winding is cut-off prior to the end of the phase. Termination of current flow to the phase winding normally causes ringing in the motor because of the abrupt transition in current flow which occurs at current cut-off. However, according to the invention, current flow to the phase winding is controlled throughout the active portion of the phase in accordance with the current profile. This profile the slope of current ramp-up during the initial portion of the profile until the peak current level is achieved; and, curvature of the current profile subsequent to cut-off of current flow to the phase winding. The current profile is controlled such that the slope of curvature of the profile immediately prior to current cut-off corresponds to the slope thereof immediately after cut-off. As a result, there is no transition in the current profile at current cut-off, and no ringing is produced in the motor by terminating current flow to the phase winding. Other objects and features will be in part apparent and in part pointed out hereinafter.

BRIEF DESCRIPTION OF THE DRAWINGS

FIG. 4A is a graph of the winding inductance of a motor phase during active and inactive portions of the motor phase;

FIG. 4B represents a typical current profile during the active portion of a phase and the PWM signal characteristics of the control signal used to produce the profile;

FIG. 4C represents the average voltage of the PWM signal of FIG. 4B;

FIG. 4D represents a current profile produced by the circuits of the present invention and one type PWM signal used to produce the profile;

FIG. 4E represents the average current of the PWM signal of FIG. 4D;

FIG. 9A represents a first prior art waveform and illustrates stator and rotor pole alignment at the commencement of current flow into a phase winding and a current flow cut-off into the winding;

FIG. 9B is an enlarged section of the waveform showing the transition which occurs at current cut-off;

FIG. 10A represents a second prior art waveform and pole alignment configuration where current flow is controlled such that the transition between current flow into the phase winding and current cut-off occurs at a lower normal force region;

FIG. 10B is an enlarged section similar to that of FIG. 9B;

FIG. 11A represents a third prior art waveform in which the current waveform is further controlled for the transition in the slope of the current waveform at cut-off to be further reduced;

FIG. 11B is an enlarged section similar to that of FIGS. 9B and 10B;

Corresponding reference characters indicate corresponding parts throughout the drawings.

DESCRIPTION OF PREFERRED EMBODIMENTS

Figure 1:
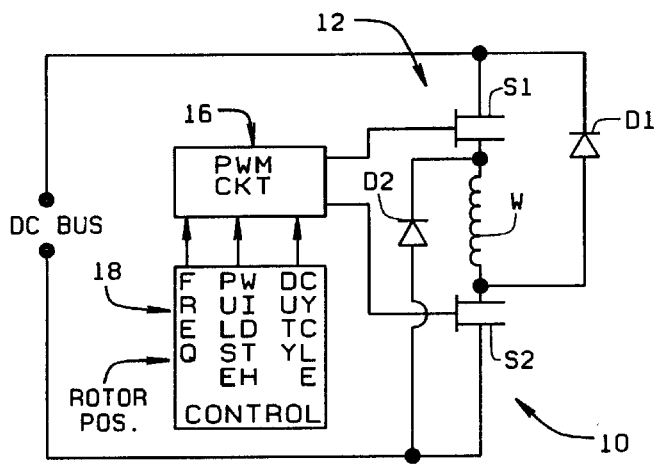
FIG. 1 is a schematic of a first circuit of the present invention for manipulating the current profile of the current supplied to an SRM winding during the active portion of the phase.

Referring to the drawings, a switched reluctance motor M (see FIGS. 6A and 6B) is a single phase switched reluctance motor; or, the motor can be a poly-phase motor such as a 2-phase, 3-phase, or 4-phase motor which is typically a multiple pole motor. Examples of such motors are a 12-6, 2-phase motor, or a 6-4, 3-phase motor. The motor has a stator assembly S including a plurality of stator teeth ST only one of which is shown in the drawings. The motor further includes a rotor assembly R which is mounted on a shaft H and disposed for rotation relative to the stator assembly. The rotor assembly includes a plurality of rotor teeth RT. As the rotor rotates in the clockwise direction indicated in the drawings, forces are created in both the stator and rotor assemblies. These forces reach a peak when a rotor tooth is directly opposite a stator tooth, as indicated by the magnitude of the arrows in the respective FIGS. 6A and 6B. These forces create an ovalizing effect on the motor.

During operation of the motor, each respective motor phase is eneregized and de-energized in a sequential manner. The length of time each phase is active is based on various operating parameters and various control schemes have been implemented to determine when switching should occur from one phase to the next. When the phase becomes active, current is supplied to a phase winding W of the motor. Current is continuously supplied to the winding during the interval the phase is active. As shown in FIG. 4B, current supply to the winding commences at a time $T_0$.

Figure 8:
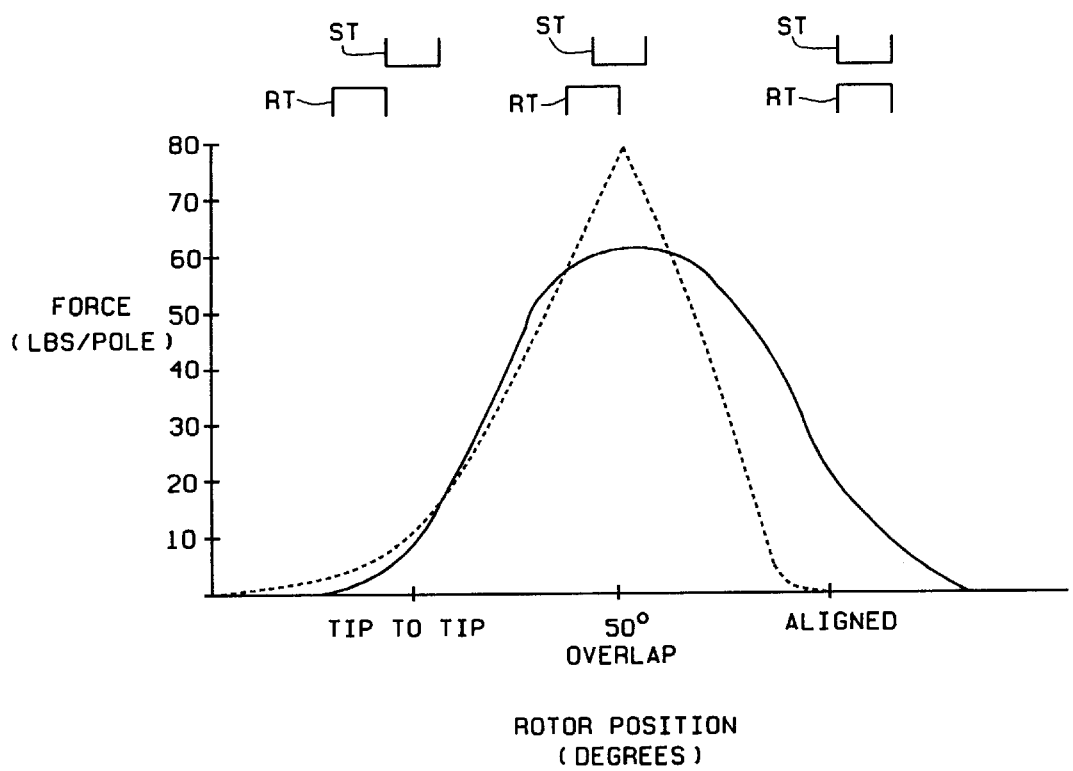
FIG. 8 is a graph of force as a function of rotor position which occurs as a result of the use of the noise reduction methodology of the present invention.

In FIG. 8, the forces in the motor are shown as a function of the position of a rotor tooth or pole RT to a stator tooth or pole ST. As the rotor moves from a position where the rotor tooth is tip-to-tip with the stator tooth to a position where it is fully aligned, the dash line curve representing the forces which occur in prior art situations are shown to rapidly increase to a peak valve which is on the order of 80 pounds of force per pole. In accordance with the present invention, by controlling the waveform throughout, the solid line force curve of FIG. 8 is a more gradual curve which has a maximum of only 60 points of force per pole. Further, the slope of this solid curve is gradual and there are no sharp transitions such as occur at the peak of the darkened line curve. It is the elimination of such an abrupt transition that produces a reduction in the ringing and internal motor forces.

Referring to FIGS. 9A–12, FIG. 9A illustrates the relationship between the current waveform generated when current is supplied to a phase winding as a function of the relationship between the rotor teeth and the stator teeth. In FIG. 12A, current flow to a stator winding commences, for example, when a stator tooth SP1 is intermediate a pair of rotor teeth RP1 and RP2. The direction of rotor rotation is indicated as counter-clockwise in the drawing. Current flow to the phase winding ceases when stator tooth SP1 and rotor teeth RP1 are aligned. This is the time when the normal forces within the motor are the greatest. The amount of rotor movement between these two positions is, for example, 22.5°. During the time it takes for the rotor to move between the two positions, current flow into the associated phase winding is shown to have been driven from zero to a peak value. A current cut-off occurs at the time when the stator tooth SP1 and rotor tooth RP1 are aligned. From cut-off, the current in the phase winding is driven to zero. Because the switching occurs at the time of maximum normal forces, the ringing which occurs is greatest. The abrupt transition which occurs at this time is shown in FIG. 9B.

In FIG. 10A, current flow to the stator winding for the phase commences at the same time as previously with the stator pole SP1 intermediate the rotor poles RP1 and RP2. Employing the control strategy employed in co-assigned patent application Ser. No. 08/175,268 the current cut-off now occurs prior to the stator pole and rotor pole aligning. That is, current cut-off occurs after approximately 15° of rotor travel. The effect is to produce an extended tail current condition; in this instance, one that is 7.5° longer than previously. In addition, the transition from current flow to no flow now occurs at a time when the normal forces are not at a maximum, although they are still high. That is, the stator pole SP1 and rotor pole RP1 are only partially aligned. However, the transition which occurs at current cutoff (see FIG. 10B) is still relatively abrupt meaning ringing still occurs.

Figure 14:
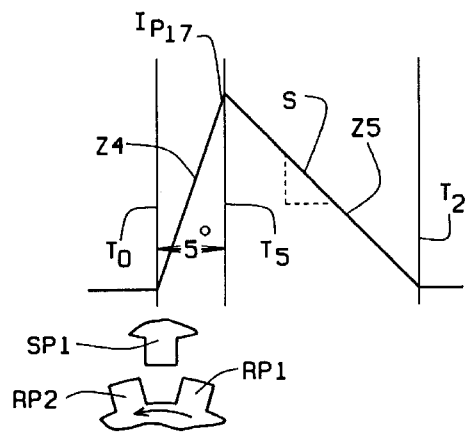
FIG. 14 represents yet a third waveform achievable in accordance with the method.

With respect to both FIGS. 9A and 10A, it will be noted that, as discussed above, the current waveform is profiled so that the initial ramp-up of current at the beginning of a phase is much steeper in FIG. 14 than in FIG. 13. From the peak, $I_{P9}$ or $I_{P10}$ the current waveform is controlled to soften the steepness of the slope prior to the transition.

FIG. 11A represents the results of a second modification to the waveform as taught in patent application Ser. No.

08/175,268. Both the time of current flow to the phase winding and its termination are as shown in FIG. 14. However, in accordance with the teachings of this co-pending application, the peak current level is $I_{P11}$ is greater than either peak current $I_{P9}$ or $I_{P10}$. And, the change in slope at current cut-off is much less steep than the transition in either of the preceding figures as shown in FIG. 11B. The result is another appreciable diminution in the amount of ringing even through the normal motor forces are still high.

An apparatus 10 of the present invention is used to control the current profile P (see FIG. 4D) in a single or poly-phase switched reluctance motor M during an active portion of each phase. As shown in FIG. 1, phase winding W is connected to a DC bus via a switch means 12. The switch means directs current flow into the winding when the phase is active and includes a first switch S1 for connecting the winding to the other side of the bus. The switch means also includes respective diodes D1, D2. When the phase represented by the winding is active, switches S1, S2 are closed.

Figure 6A:
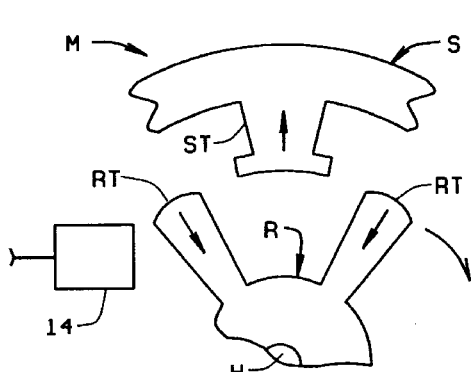
FIGS. 6A and 6B illustrate the forces created in a motor during passage of a rotor pole of the motor past a stator pole; and, FIGS. 7A–7C respective various PWM signal characteristics when are ob3ainable with the circuits of the present invention to obtain the current profile of FIG. 4D.
Figure 6B:
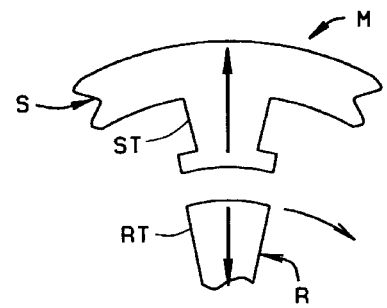

Various sensing means are provided for determining motor operating parameters. In FIG. 6A, for example, a Hall effect sensor 14 is provided for determining the instantaneous position of rotor assembly R. Other sensors, while not shown, are used to provide motor speed, torque, and similar parametric information. Next, a signal generating means indicated generally 16 in FIG. 1 includes PWM signal generator which provides operating signals to one or both of the switches S1, S2, for reasons described hereinafter, to control current flow to winding W. A control means indicated generally 18 in FIG. 1 is responsive to inputs from the sensing means to control operation of the signal generating means. The control means controls operation of the signal generating means so the signal generating means provides operating signals having operating characteristics by which the current supply to the winding is in accordance with a predetermined profile.

Figure 5A:
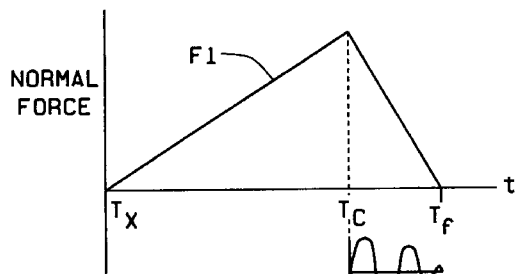
FIG. 5A graphically depicts the normal motor force during a phase active portion of a phase and the resultant ringing produced when the phase becomes inactive, the current profile for the motor corresponding to that of FIG. 4B.

Referring to FIGS. 4A, 4B, and 5A, a typical current profile Pi for a motor phase, and the resulting normal force in the motor are shown. In FIG. 4B, the current level is shown to be zero amps prior to the particular phase with which the winding is associated becoming active. The phase becomes active at time $T_0$. Thereafter, until a time $T_c$, current is supplied to the phase winding. At time $T_c$, the phase becomes inactive and current flow into the winding ceases. From time $T_c$ until a time $T_f$, the current decays back to zero. When current begins flowing into the phase winding, the current level typically rises to a level $I_p$, this level being reached at a time $T_x$. From the time $T_x$ until the time $T_c$, the current flow into the winding is constant and is maintained at the level $I_p$. When current flow into the winding ceases at time $T_c$, there is an abrupt transition in the slope of the current profile. This is because the current in the winding at time $T_c$ is rapidly driven to zero as indicated by the sharp slope in the current profile. The inductance profile L for winding W is represented in FIG. 4A, and represents the inductance in the winding with current supplied to the phase in accordance with the profile of FIG. 4B. As shown in FIG. 5A, the normalized force profile F1 for the motor also shows an abrupt transition at the current cut-off time $T_c$. The result of this sharp change in slope of the normalized force profile is a loud ringing which is represented by the waveform V1 in FIG. 5A. This ringing, in turn, produces a high noise level in motor. This noise level is undesirable.

Figure 5B:
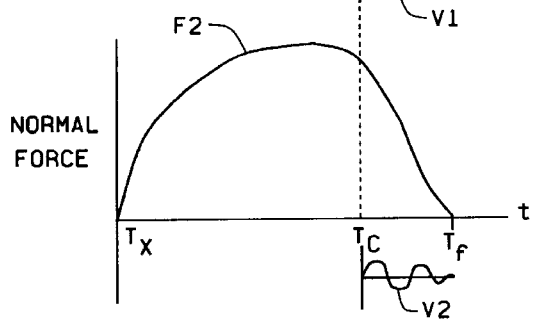
FIG. 5B graphically depicts the normal motor force during a phase active portion of a phase and the resultant ringing produced when the phase becomes inactive, the current profile for the motor corresponding to that of FIG. 4D.

It is a feature of circuit 10, and the method of the present invention, to produce a current profile such as the profile P2 shown in FIG. 4D. In accordance with the method, current flow into the winding rapidly increases from zero to a peak value $I_p'$ when the phase becomes active. As shown in FIG. 4D, the current is driven to this peak value in the interval between $T_o$ and $T_x$. From time $T_x$, the current is then allowed to decrease from this peak value to a second and lesser value, for example, the current level $I_p$ by the time the phase becomes inactive at time $T_c$. The current then decays from this second value to zero when the phase becomes inactive. The advantage of controlling the current profile in this manner is that the slope of the current profile between time $T_x$ and time $T_c$ is no longer substantially flat as occurs in the typical situation of FIG. 4B. Rather, the current profile has a slope (a negative slope) which is similar to that of the slope from time $T_{x\ to\ time\ Tf}$, although the slope is not as abrupt. Now, when current supply to the phase is stopped at time $T_c$, the transition in the current profile which occurs is not an abrupt transition, but a much gentler, or smoother transition. In FIG. 5B, which shows the normal force profile F2 for the motor when current is supplied to a phase in accordance with the profile P2, this smoother transition reduces the amount of ringing in the motor which now occurs when current flow into the winding ceases. This is shown by the waveform V2 in FIG. 5B. As shown, the result is a significant reduction in motor noise.

Figure 2:
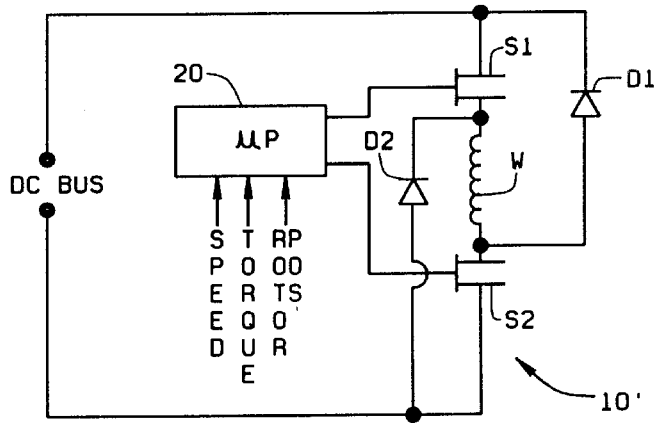
FIG. 2 is a schematic of a second circuit of the invention for manipulating the current profile.
Figure 3A:
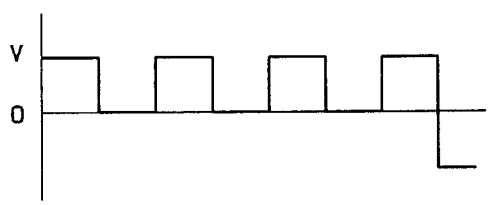
FIGS. 3A, 3B, and 3C respectively represent soft chopping, hard chopping, and zero volt chopping PWM waveforms for controlling current supply to a winding.
Figure 3B:
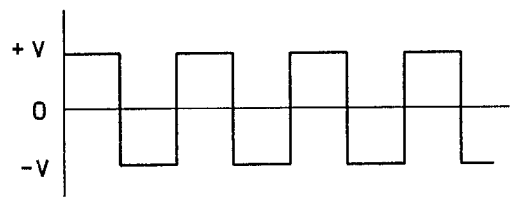
Figure 3C:
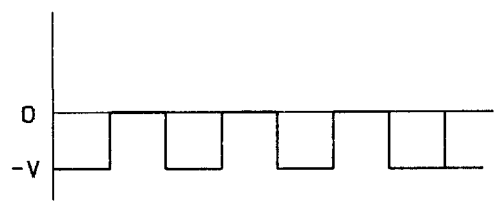

As noted above, circuit 10 of the present invention, includes a PWM signal generator 16 which supplies operating signals to one or both of the switches So, S2. Alternatively, and as shown in FIG. 2, a circuit 10' utilizes a microprocessor which has a PWM signal output to also supply operating signals to the switches. Either signal generator 16 or microprocessor 20 is capable of supplying a PWM signal which is a "soft" chopping signal, or a "hard" chopping signal. A soft chopping PWM signal is shown in FIG. 3A, a hard chopping signal in FIG. 3B. If the signal generator or microprocessor supplies a soft chopping signal, this signal is only supplied to one of the switches: for example, switch S2, to modulate the switch between its "on" and "off" positions. The other switch S1 is maintained in a constant "on" state during the active portion of the phase. On the other hand, if the signal generator or microprocessor supplies a hard chopping signal, it is supplied simultaneously to both switches.

Referring to FIG. 4C, a PWM signal G1 is shown by which the current is supplied to a phase winding in accordance with the current profile P1. Signal Go has a constant frequency and constant duty cycle throughout the phase active interval extending from time $T_o$ to time $T_c$. An average voltage curve A1 represents the average voltage of the PWM waveform supplied to the phase during its active interval and is shown to be a constant value throughout. To achieve the current profile P2 in accordance with the teachings of the present invention, the PWM signal or signals G2 (see FIG. 4E) supplied to the winding can be controlled in a number of different ways. In FIG. 4E, the operating signals are shown to have a constant frequency, but variable duty cycle. Thus, as seen in FIG. 4E, from time $T_o$ to time $T_x$, the operating signals have a duty cycle which start at a first value and then become progressively shorter throughout this interval. From time $T_x$ to time $T_c$, the operating signals have a constant duty cycle. However, this duty cycle is shorter than the duty cycle of any of the operating signals supplied the switch or switches from time $T_o$ to time $T_x$. Now, the average voltage curve of the PWM signals supplied to the phase during its active portion is shown to have a first segment where the average voltage is substantially greater than that of a second segment. The length of the respective segments correspond to the respective intervals of variable and fixed duty cycle PWM signal supply to the phase. This is significant because it means that to drive the current to the desired peak level $I_p'$ by time $T_x$, the average voltage input to the phase must be significantly higher than that which is otherwise supplied.

Figure 7A:
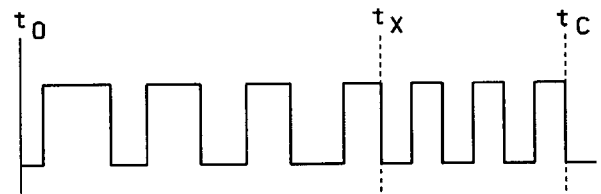
Figure 7B:
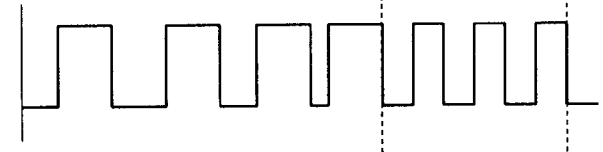
Figure 7C:
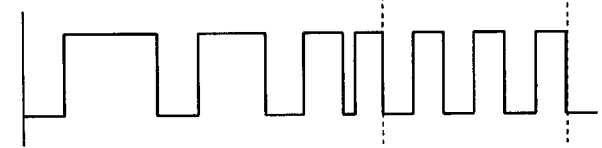

Referring to FIGS. 7A–7C, FIG. 7A indicates a PWM operating signal stream which corresponds to that shown in FIG. 4E. Again, according to this scheme, from times $T_o$ to $T_x$, the duty cycle of the operating signals are initially at a first value and then become progressively shorter. From times $T_x$ to $T_c$, the operating signals have a constant duty cycle which is shorter than the duty cycle of any of the operating signals supplied the switch means from times $T_o$ to $T_x$. In FIG. 7B, an alternate way of achieving the same result; that is, supplying a significantly higher voltage to the phase during the first portion of a phase active interval, includes supplying PWM signals having a constant duty cycle but a variable frequency. The frequency starts a selected frequency which becomes progressively higher during the interval $T_o$ to $T_x$. From times $T_x$ to $T_o$, the operating signals have a constant frequency which is higher than the frequency of any of the operating signals supplied the switch means from times $T_o$ to $T_x$. Finally, in FIG. 7C, a third method of supplying a significantly higher voltage to the phase during the first portion of a phase active interval, includes supplying PWM signals having both a variable duty cycle and a variable frequency. Regardless of how the frequency and duty cycle of the signals vary the interval $T_o$ to $T_x$ from times $T_x$ to $T_o$, they operating signals have both a constant frequency and a constant duty cycle.

Figure 12:
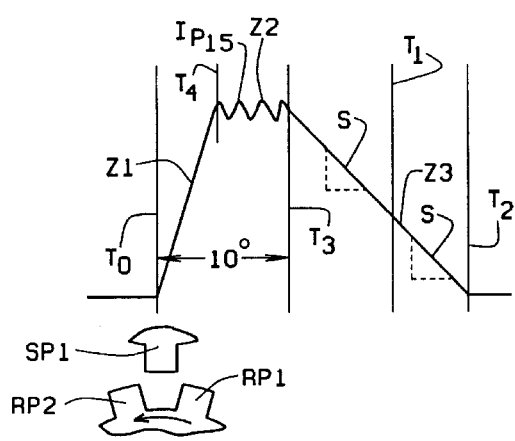
FIG. 12 represents a current waveform produced in accordance with the method of the present invention in which there is an earlier and more gradual transition at cut-off and correspondingly less noise.

For a given set of operating conditions, an interval $T_0$–$T_2$ for a given phase can be determined. Further, both the current start time $T_x$ and current cut-off time can be determined as a function of rotor position based on inputs from a rotor position sensor. Referring to FIG. 12, the phase interval $T_0$–$T_2$ is known. So also is the point $T_1$ at which current cut-off would occur. If the tail current decay is a straight-line as shown in the figures, then the slope of the tail current decay line can be determined by control means 18. In addition, and in accordance with the teachings of co-pending application Ser. No. 08/175,268, the current I is driven from zero steeply upward to a peak value $I_p$. From this peak value, the current now falls-off. By projecting the straight-line tail current curve backward from the cut-off point $T_1$, and by profiling the current as it falls-off from peak value $I_p$. A new transition point $T_3$ is established. This point, as shown in FIG. 12, is, for example, represents only 10° of rotor travel from time $T_0$. Regardless, by effecting the transition at time $T_3$ rather than time $T_2$, and by profiling the straight-line tail current curve from time $T_3$ to time $T_1$ to have the same slope S as the portion of the curve from time $T_1$ to time $T_2$, there is no transition in the slope either at time $T_2$ or at the time when rotor tooth RPI and stator tooth SPI are aligned. The result is that any noise or ringing due to current cut-off is substantially eliminated.

With respect to the resultant current profile depicted in FIG. 12, the initial or ramp-up portion Z1 of the profile is controlled by hard chopping or soft chopping of the input current waveform, or by an initial voltage pulse during the current toward its peak value. The intermediate portion X2 is controlled in accordance with the teachings of co-pending patent application Ser. No. 08/187,532. The start current portion of the profile is again controlled by hard chopping or soft chopping. In addition, the current profile can be controlled without additional current being introduced into the phase if sufficient current already exists in the phase winding. As noted, the new transition point $T_3$ occurs much earlier in time than the previous transition point $T_2$. This allows the ramp-down portion Z3 of the current profile a much longer time to develop than was previously so. Referring to FIG. 9A, the time between the beginning of the phase $T_0$ and the transition point $T_1$ was 22.5°, and in FIGS. 10A and 11A, 15°. Now, this interval is 100°. That is, the time between the beginning of a phase and the transition point has been reduced by one-third. The trade-off which results because of this is that the peak current $I_{p12}$ may be greater than any of the peak currentes $I_{p9}$–$I_{p11}$. This means the initial current ramp-up has to be considerably steeper than occurs in any of the various prior art control schemes exemplified by these Figures. However, the benefit is that ringing is eliminated with the slope S being constant both before and after time $T_1$. Also, it will be noted that the peak normal forces which are occurring in the motor at this time are lower than those present when stator pole SPI is aligned with rotor pole RPI.

The control techniques previously described with respect to control means 18 are now used to fully control the current profile throughout each phase interval. The control means can, for example, incorporate a schedule by which, for various motor operating parameters, will provide the current profile shown in FIG. 12 for a predetermined phase interval. Or, the motor can be otherwise remotely controlled to effect the same result. It will be understood that with the motor being used in a variety of applications such as appliance applications, there will be a diversity in all of the pertinent parameters, but the end result will be the same in each.

Figure 13A:
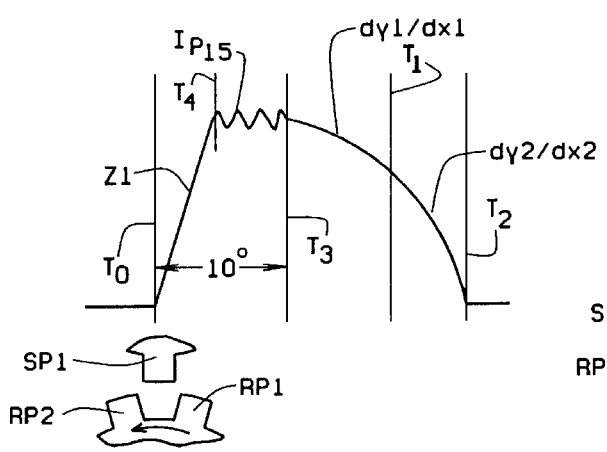
FIG. 13A represents a second current waveform achievable with the method and in which the slope is a smooth slope having an earlier and more gradual transition at cut-off.
Figure 13B:
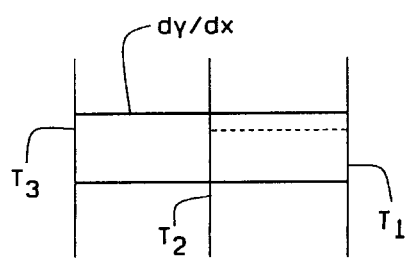
FIG. 13B is a plot of rate of change of slope over time for the portion of the current profile from time $T_3$ to $T_2$.

Referring again to FIG. 13A, the transition and profiling in the previous example has been accomplished to provide a straight line path from time $T_3$ to time $T_2$. However, for control purposes, not only for elimination of ringing but other motor control purposes as well, it is not necessary that the current profile be a straight line. In FIG. 13A, there is shown a current profile in which the tail current portion of the profile also has a constant change in slope. In FIG. 13A, the phase begins at time $T_0$ and extends to time $T_2$ as in the previous example. Current cut-off again appears at time T which occurs when the rotor has rotated approximately 10°, this again being similar to what is shown in FIG. 12. The current has an initial ramp-up portion Z, similar to that in FIG. 12. And, the peak current $I_{p16}$ which is attained at the end of this ramp-up approximates the peak current $I_{p13}$ attained in the previous example. Now, the transition point which occurs, occurs at time $T_3$, the same as in the previous example. The profiling of the current which occurs between time $T_4$ and $T_3$ is again in accordance with co-pending application Ser. No. 08/187,532. At time $T_3$, control means 18 initiates a ramp-down of the current with current cut-off still occurring at time $T_1$. Because the tail current profile now is represented by a concave curve, it is now not the slope S of the curve which is controlled by the control means, but rather the rate of change of the slope. That is, from time $T_3$ to time $T_1$, the rate of change $dy_1/dx_1$, representing the rate of change is the slope of the curve is consistent with the rate of change $dy_2/dx_2$ representing the rate of change of slope from time $T_1$ to time $T_2$. As shown in FIG. 13B, the graph of the rate of change of the slope shows a straight line throughout the interval from $T_3$ through $T_2$ to $T_1$. If, as indicated by the dashed line, there is a change in the rate of change of the slope at time $T_2$, then ringing would occur.

Referring to FIG. 14, it is shown that it is not necessary to have an intermediate section $Z_2$ in order to develop a current profile in which the transition occurring in the tail current slope at current cut-off is smooth so there is no ringing. In FIG. 14, there are now only an initial ramp-up portion $Z_4$ of the current profile, and a tail current portion $Z_5$ of the profile. Now, the ramp-up portion of the profile encompasses only 5°, for example, of rotor movement of rotor tooth $RP_1$ with respect to stator tooth $SP_1$. And, the peak current $I_{p14}$ is at a level higher than peak currents $I_{p12}$ or $I_{p13}$ in the preceding examples. To effect the profile shown in FIG. 14, the slope of the current ramp-up portion of the profile is substantially steeper than that shown in the preceding examples. The transition between the ramp-up and tail current portion occurs at a time $T_5$ with the time $T_0$–$T_5$ being approximately one-half the interval $T_0$–$T_3$ in the previous examples. On the other hand, the slope of the tail current portion of the current profile is shallower than the corresponding tail current portions of the previous examples. Again, control means 18 controls the signals by which the current profile is produced. These signals can produce soft chopping, hard chopping, and zero volt chopping to achieve the profile. However, because the profile of FIG. 14 has no transition interval $Z_2$ such as is shown in FIG. 12, there is no chopping at the transition point in the profile.

Figure 15:
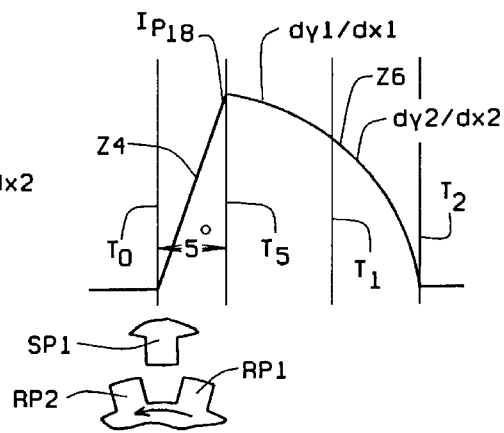
FIG. 15 represents a fourth waveform achievable in accordance with the method.

The current profile of FIG. 15 is similar to that of FIG. 13A in that the tail current is not a straight line but rather a concave curved profile. And, like the waveform profile of FIG. 14, there is only a ramp-up and tail current portion of the profile. The ramp-up portion $Z_4$ of the current profile can be the same as the portion $Z_4$ of the preceding example with the peak current $I_{p15}$ reaching the same level as the peak current $I_{p14}$. Now, the rate of change in slope $dy_1/dx_1$ for the tail current portion before current cut-off is the same as the rate of change in slope $dy_2/dx_2$ which results in the portion of the curve after cut-off.

It will be appreciated that with respect to the above examples, that a variety of current profiles can be produced in which the normal forces which naturally occur within the motor because of the stator pole and rotor pole orientations can be minimized to the extent that little or no ringing occurs in the motor and that no extraneous motor noise is produced because of this "ovalizing" effect. The appropriate programming of control means 18 affords the capability of responding to any set of motor operating conditions, to provide any desired current profile, especially one in which all portions are controllable using PWM output signals in combination with hard chopping, soft chopping, and zero volt chopping of the current, as required. This adaptability to the particular operating environment (in an appliance, for example) as well as the particular operating conditions present, where the tail current control provides a constant slope, or constant rate of change of slope depending upon the current profile produced, is particularly advantageous. This is because it enables the user to minimize or eliminate the effect of impulse motor forces under whatever conditions exist at any given time.

What has been described is a control circuit for controlling tail current decay in a SRM. The circuit operates to control tail current decay so as to eliminate motor noise in SRM's. The motor ringing which occurs when circuit 10 is used is eliminated. To accomplish this, the control circuit combines both hard chopping, soft chopping, and zero volt copping current decay control techniques. And, control is such that there is no abrupt transition at current cut-off which would produce ringing or noise. The control circuit is usable with a variety of poly-phase SRM's, including a wide range of SRM stator pole and rotor pole combinations. The control circuit controls overall phase switching between the respective phases of a SRM. As part of its operation, the control means is particularly effective in eliminating noise in SRM's operating at low speed/high torque because the effect of normal ovalizing forces, which produce noise in SRM's are lower at high speed motor operation, is substantially reduced or eliminated. The control means varies both frequency and duty cycle to effect a desired soft chopping/hard chopping/zero volt chopping strategy. Of particular importance, the entire current profile is controlled by the control means so the current in a phase winding has a predetermined set of phase profile characteristics throughout a phase's cycle (both active and inactive). The current profile control includes the ramp-up portion, tail current portion, and an intermediate portion between the other two portions with each portion being separately profiled by the control means. Also, the slope of the ramp-up portion, and curvature (straight line, concave) of the tail current is controlled so the eliniation of ringing is achieved regardless of the profile implemented. Finally, the control circuit provides a low cost, reliable way of reducing noise throughout the range of SRM operation.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A method of energizing a phase winding in a reluctance machine over a given interval of rotor rotation to reduce noise emissions from the machine, the reluctance machine including a rotor defining at least one rotor pole and a stator definig at least one stator pole about which is positioned at least a portion of the phase winding, wherein the given interval of rotation begets at a point where the at least one rotor pole is unaligned with the at least one stator pole and ends at approximately the point where the at least one rotor pole is aligned with the at least one stator pole, the method comprising the acts of:

(i) applying controlled voltage having a first average value to the phase winding over a first portion of the given interval of rotor rotation defined by the beginning of the given interval to a first time point, such that the current in the phase winding increases over the first portion to a peak current value over the active interval of the phase winding; and (ii) applying controlled voltage to the phase winding over a second portion of the given interval of rotor rotation following the first portion defined by the first time point to the end of the given interval, over which the phase current decays to zero wherein the average value of the applied controlled voltage is: (i) positive and lower than the first average value; (ii) decreasing from one positive value to another value over a portion of the second portion; and (iii) is controlled over time such that the current in the phase winding decreases in a controlled manner from the peak current value to zero and noise emissions from the machine are reduced.

2. The method of claim 1 wherein the act of applying controlled voltage to the phase winding over the first portion includes the act of hard-chopping the phase current.

3. The method of claim 2 wherein the act of applying controlled voltage to the phase winding over the first portion includes the act of soft-chopping the phase current.

4. The method of claim 1 wherein the act of applying controlled voltage to the phase winding over the first portion includes the act of applying an initial voltage pulse to the phase winding.

5. The method of claim 1 wherein the act of applying the controlled voltage to the phase winding over the second portion includes the act of applying the controlled voltage such that the rate at which the phase current decreases over time is substantially constant over the second portion.

6. The method of claim 1 wherein the act of applying the controlled voltage to the phase winding over the second portion includes the act of applying the controlled voltage such that the rate at which the phase current decreases over time increases over the second portion.

7. The method of claim 6 wherein the rate of change in the rate at which the phase current decreases over time is substantially constant over the second portion.

8. The method of claim 1 wherein the act of applying controlled voltage to the phase winding over the second portion includes the act of hard-chopping the phase current.

9. The method of claim 8 wherein the act of applying controlled voltage to the phase winding over the second portion includes the act of soft-chopping the phase current.

10. A method of energizing a phase winding in a reluctance machine over a given interval of rotor rotation to reduce noise emissions from the machine, the reluctance machine including a rotor defining at least one rotor pole and a stator defining at least one stator pole about which is positioned at least a portion of the phase winding, wherein the given interval of rotation begins at a point where the at least one rotor pole is unaligned with the at least one stator pole and ends at approximately the point where the at least one rotor pole is aligned with the at least one stator pole, the method comprising the acts of:

(i) applying controlled voltage having a first average value to the phase winding over a first portion of the given interval of rotor rotation defined by the beginning of the given interval to a first time point, such that the current in the phase winding increases over the first portion to a peak current value; and (ii) applying controlled voltage having a second average value that is positive and lower than the first average value to the phase winding over a second portion of the given interval of rotor rotation following the first portion defined by the first time point to a second time point to maintain a desired phase current profile over the second portion; and (iii) applying controlled voltage to the phase winding over a third portion of the given interval of rotor rotation following the first and second portions defined by the second time point to the end of the given interval, wherein the average value of the controlled voltage is positive and is controlled over time such that the current in the phase winding decreases in a controlled manner from the peak current value to zero and noise emissions from the machine are reduced.

11. The method of claim 10 wherein the act of applying controlled voltage to the phase winding over a second portion of the given interval of rotor rotation following the first portion includes the act of maintaining the average phase current at a substantially constant desired value over the second portion.

12. The method of claim 11 wherein the act of applying controlled voltage to the phase winding over the first portion includes the act of hard-chopping the phase current.

13. The method of claim 12 wherein the act of applying controlled voltage to the phase winding over the first portion includes the act of soft-chopping the phase current.

14. The method of claim 11 wherein the act of applying controlled voltage to the phase winding over the first portion includes the act of applying an initial voltage pulse to the phase winding.

15. The method of claim 11 wherein the act of applying the controlled voltage to the phase winding over the third portion includes the act of applying the controlled voltage such that the rate at which the phase current decreases over time is substantially constant over the third portion.

16. The method of claim 11 wherein the act of applying the controlled voltage to the phase winding over the third portion includes the act of applying the controlled voltage such that the rate at which the phase current decreases over time increases over the third portion.

17. The method of claim 16 wherein the rate of change in the rate at which the phase current decreases over time is substantially constant over the third portion.

18. The method of claim 11 wherein the act of applying controlled voltage to the phase winding over the third portion includes the act of hard-chopping the phase current.

19. The method of claim 18 wherein the act of applying controlled voltage to the phase winding over the third portion includes the act of soft-chopping the phase current.

20. The method of claim 18 wherein the act of applying controlled voltage to the phase winding over the third portion includes the act of zero-volt-chopping the phase current.

21. A method of energizing a phase winding in a reluctance machine over a given interval of rotor rotation to reduce noise emissions from the machine, the reluctance machine including a rotor defining at least one rotor pole and a stator defining at least one stator pole about which is positioned at least a portion of the phase winding, wherein the given interval of rotation begins at a point where the at least one rotor pole is unaligned with the at least one stator pole and continues as the at least one rotor pole rotates towards the at least one stator pole, the method comprising the acts of:

controlling the current in the machine over a first portion of the given interval defined by the beginning of the given interval to a first time point such that the current in the phase winding increases from zero to a peak positive value; and controlling the current in the machine over a second portion of the given interval defined by the first time point to the end of the given interval such that the phase current begins to decrease from the peak current to zero in a controlled manner wherein: (i) the current begins to decrease from the peak current value at a point prior to alignment of the at least one rotor pole with the at least one stator pole; and (ii) the slope of the profile of the phase current decreases at a constant rate of change, such that the profile of the phase current as it decreases over time is concave throughout the interval over which the phase current decreases from the peak current value to zero.

22. The method of claim 21 wherein the act of controlling the current in the machine over the second portion includes the act of maintaining the phase current at the peak current value for an interval of rotor rotation prior to the point where the phase current begins to decrease.

* * * * *

UNITED STATES PATENT AND TRADEMARK OFFICE
CERTIFICATE OF CORRECTION

PATENT NO. : 5,986,418

DATED : November 16, 1999

INVENTOR(S) : Gary E. Horst and J. Joseph Muller

It is certified that error appears in the above-identified patent and that said Letters Patent is hereby corrected as shown below:

In column 12, line 36, after the word "rotation," delete "begets" and insert -- begins-- therefor.

Signed and Sealed this

Seventeenth Day of October, 2000

Attest:

Q. TODD DICKINSON

*Attesting Officer*   *Director of Patents and Trademarks*